US012666199B2

(12) United States Patent
Machida

(10) Patent No.: US 12,666,199 B2
(45) Date of Patent: Jun. 23, 2026

(54) SPEAKER DEVICE

(71) Applicant: FOSTER ELECTRIC COMPANY, LIMITED, Tokyo (JP)

(72) Inventor: Kentaro Machida, Tokyo (JP)

(73) Assignee: FOSTER ELECTRIC COMPANY, LIMITED, Tokyo (JP)

( * ) Notice: Subject to any disclaimer, the term of this patent is extended or adjusted under 35 U.S.C. 154(b) by 134 days.

(21) Appl. No.: 18/710,013

(22) PCT Filed: Oct. 28, 2022

(86) PCT No.: PCT/JP2022/040350
§ 371 (c)(1),
(2) Date: May 14, 2024

(87) PCT Pub. No.: WO2023/090124
PCT Pub. Date: May 25, 2023

(65) Prior Publication Data
US 2025/0016497 A1 Jan. 9, 2025

(30) Foreign Application Priority Data
Nov. 19, 2021 (JP) ................................ 2021-189016

(51) Int. Cl.
*H04R 1/28* (2006.01)
*H04R 9/02* (2006.01)
(Continued)

(52) U.S. Cl.
CPC ............ *H04R 1/288* (2013.01); *H04R 9/025* (2013.01); *H04R 9/043* (2013.01); *H04R 9/063* (2013.01); *H04R 2400/11* (2013.01)

(58) Field of Classification Search
CPC ........ H04R 1/288; H04R 9/025; H04R 9/043; H04R 9/063; H04R 2400/11; H04R 9/02;
(Continued)

(56) References Cited

U.S. PATENT DOCUMENTS 4,176,249 A 11/1979 Inanaga et al.
6,031,925 A * 2/2000 Shteyn .................. H04R 9/063 381/403
(Continued)

FOREIGN PATENT DOCUMENTS

JP S59-215199 A 12/1984
JP S60-006157 B2 2/1985
(Continued)

OTHER PUBLICATIONS

Dec. 6, 2022, International Search Report issued for related PCT Application No. PCT/JP2022/040350.
(Continued)

*Primary Examiner* — Sean H Nguyen
(74) *Attorney, Agent, or Firm* — Paratus Law Group, PLLC

(57) ABSTRACT

A speaker device includes: a first voice coil; a second voice coil disposed radially outside the first voice coil; a first damper supporting the first voice coil to a frame; and a second damper supporting the second voice coil to the frame, and the first damper includes a recessed portion, which is separated from the second voice coil more than other portion of the first damper, on an extension line of a vibration direction of the second voice coil.

15 Claims, 7 Drawing Sheets

(51) Int. Cl.
*H04R 9/04* (2006.01)
*H04R 9/06* (2006.01)

(58) Field of Classification Search
CPC ... H04R 9/06; H04R 9/04; G10K 9/13; G10K 9/18
USPC .......................................................... 381/413
See application file for complete search history.

(56) References Cited

U.S. PATENT DOCUMENTS

| | | | | | |
|---|---|---|---|---|---|
| 2006/0204028 | A1* | 9/2006 | Lim | H04R 9/063 | 381/396 |
| 2012/0148086 | A1* | 6/2012 | Tanabe | H04R 1/24 | 381/401 |

FOREIGN PATENT DOCUMENTS

| | | | | |
|---|---|---|---|---|
| JP | S61-202997 | U | | 12/1986 |
| JP | H06-019398 | U | | 3/1994 |
| JP | H07-011095 | U | | 2/1995 |
| JP | H11-041695 | A | | 2/1999 |
| JP | 2000-078689 | A | | 3/2000 |
| JP | 2006013587 | A | * | 1/2006 |
| JP | 2012-182773 | A | | 9/2012 |
| KR | 10-2010-0129525 | A | | 12/2010 |

OTHER PUBLICATIONS

Dec. 6, 2022, International Search Opinion issued for related PCT Application No. PCT/JP2022/040350.
Sep. 10, 2024, Translation of Japanese Office Action issued for related JP Application No. 2021-189016.
Sep. 30, 2025, Translation of Japanese Office Action issued for related JP Application No. 2024-193942.

* cited by examiner

SPEAKER DEVICE

CROSS REFERENCE TO PRIOR APPLICATION

This application is a National Stage Patent Application of PCT International Patent Application No. PCT/JP2022/040350 (filed on Oct. 28, 2022) under 35 U.S.C. § 371, which claims priority to Japanese Patent Application No. 2021-189016 (filed on Nov. 19, 2021), which are all hereby incorporated by reference in their entirety.

TECHNICAL FIELD

The present disclosure relates to a speaker device.

BACKGROUND ART

A speaker device that reproduces sound by vibrating a diaphragm is widely used in a vehicle, for example, in a vehicle interior of an automobile to reproduce sound such as music or voice. Patent Literature 1 discloses that a second drive unit facing a direction opposite to that of a first drive unit having a diaphragm which is a sound emitting member is disposed to cancel out vibration of the first drive unit by a reaction force.

Patent Literature 2 discloses a speaker device including a main body portion that performs a main function of emitting sound waves to a sound emission side, and a vibration preventing portion that prevents vibration generated in a magnetic circuit due to vibration of a vibration system of the main body portion during driving.

PRIOR ART DOCUMENTS

Patent Literatures

Patent Literature 1: JPS60-006157B
Patent Literature 2: JP2006-013587A

SUMMARY OF INVENTION

Object to be Achieved by the Invention

However, in the speaker device of Patent Literature 1, a height (a length in a vibration direction) becomes larger than that of a normal speaker having only the first drive unit, and the two drive units (speaker units) are formed and fastened, so that the number of steps is greatly increased and an assembling property is poor. Further, in the speaker device of Patent Literature 2, one hollow circular plate type magnet is shared in the magnetic circuit, a length of a damper of the vibration preventing portion decreases, and the vibration preventing portion cannot obtain an amplitude amount sufficient for canceling out the vibration of the main body portion. Further, when the amplitude amount increases, the diaphragm of the main body portion and a voice coil of the vibration preventing portion may interfere with each other. In a speaker device of a second embodiment of Patent Literature 2, since the voice coil of the main body portion is disposed outside, the amplitude amount of the main body portion is small, and the speaker device is unsuitable for a woofer for reproducing bass sound with a large output. In particular, since the speaker device such as a woofer for reproducing a bass sound range or a deep bass sound range has a relatively large drive unit itself, it is necessary to devise the speaker device to be mounted on a vehicle having a limited installation space, and space saving and thickness reduction are required.

The present disclosure has been made to solve such a problem, and an object thereof is to provide a speaker device that has an assembling property at the time of manufacturing and that is capable of improving vibration-damping characteristics while maintaining the quality of audio reproduction. Another object of the present invention is to provide a speaker device capable of achieving both improvement in the vibration-damping characteristics and thickness reduction.

Means for Achieving the Object

The present disclosure has been made to achieve at least a part of the above-described objects, and can be realized as the following aspects.

A speaker device according to the present aspect includes: a first voice coil: a second voice coil disposed radially outside the first voice coil: a first damper supporting the first voice coil to a frame; and a second damper supporting the second voice coil to the frame, and the first damper includes a recessed portion, which is separated from the second voice coil more than other portion of the first damper, on an extension line of a vibration direction of the second voice coil.

The second voice coil of the speaker device may be capable of vibrating in a direction opposite to the first voice coil.

In the speaker device, when the first damper and the second voice coil are closest to each other, a part of the second voice coil may be located in the recessed portion.

The second damper of the speaker device may include a plurality of support members arranged side by side in the vibration direction.

The speaker device may further include: a magnetic circuit including a first magnet and a second magnet, and the first magnet and the second magnet may be arranged side by side in the vibration direction.

A speaker device according to the present aspect includes: a first voice coil: a second voice coil disposed radially outside the first voice coil: a first damper supporting the first voice coil to a frame: a second damper supporting the second voice coil to the frame; and a magnetic circuit including a first magnet and a second magnet, and the first magnet and the second magnet are arranged side by side in a vibration direction of the first voice coil.

The magnetic circuit of the speaker device may include an intermediate magnetic member connected to the first magnet and connected, at a surface different from a surface to which the first magnet is connected, to the second magnet.

The intermediate magnetic member of the speaker device may form a first magnetic gap in which the first voice coil is disposed and a second magnetic gap in which the second voice coil is disposed.

The magnetic circuit of the speaker device may include a first magnetic member connected to the first magnet at a surface different from a surface to which the intermediate magnetic member is connected, and the first magnetic gap may be formed between the intermediate magnetic member and the first magnetic member.

The magnetic circuit of the speaker device may include a second magnetic member connected to the second magnet at a surface different from a surface to which the intermediate magnetic member is connected, and the second magnetic gap may be formed between the intermediate magnetic member and the second magnetic member.

The first magnet and the second magnet of the speaker device may be disposed radially inside the second voice coil.

In the speaker device, the first magnet may be disposed radially inside the first voice coil, the second magnet may be disposed radially outside the second voice coil, the intermediate magnetic member may include a central portion connected to the first magnet and an outer peripheral portion connected to the second magnet, the first magnet may be connected to the central portion of the intermediate magnetic member, and the second magnet may be connected to the outer peripheral portion of the intermediate magnetic member.

The first damper of the speaker device may include a recessed portion, which is separated from the second voice coil more than other portion of the first damper, on an extension line of a vibration direction of the second voice coil.

The recessed portion of the speaker device may have higher rigidity than the other portion of the first damper.

The intermediate magnetic member of the speaker device may protrude radially outside and have a protruding portion that forms the second magnetic gap.

The speaker device may further include: a first drive unit including the first voice coil, a diaphragm connected to the first voice coil, and the first damper; and a second drive unit including the second voice coil and the second damper, and a second vibration force generated in the speaker device in response to vibration of the second drive unit may be in an opposite direction to a first vibration force generated in the speaker device in response to vibration of the first drive unit at the same period.

The speaker device may include: a housing which accommodates the first drive unit and the second drive unit therein, and a lowest resonance frequency of the second drive unit may be the same as a lowest resonance frequency of the first drive unit.

A second electric signal for vibrating the second voice coil of the speaker device may be different from a first electric signal for vibrating the first voice coil.

Effects of Invention

According to the speaker device of the present disclosure using the above measures, it is possible to improve the assembling property at the time of manufacturing and to improve the vibration-damping characteristics while maintaining the quality of sound reproduction. Further, it is possible to achieve both improvement in the vibration-damping characteristics and the thickness reduction.

EMBODIMENTS FOR CARRYING OUT THE INVENTION

Hereinafter, embodiments of the present disclosure will be described with reference to the drawings.

First Embodiment

Figure 1:
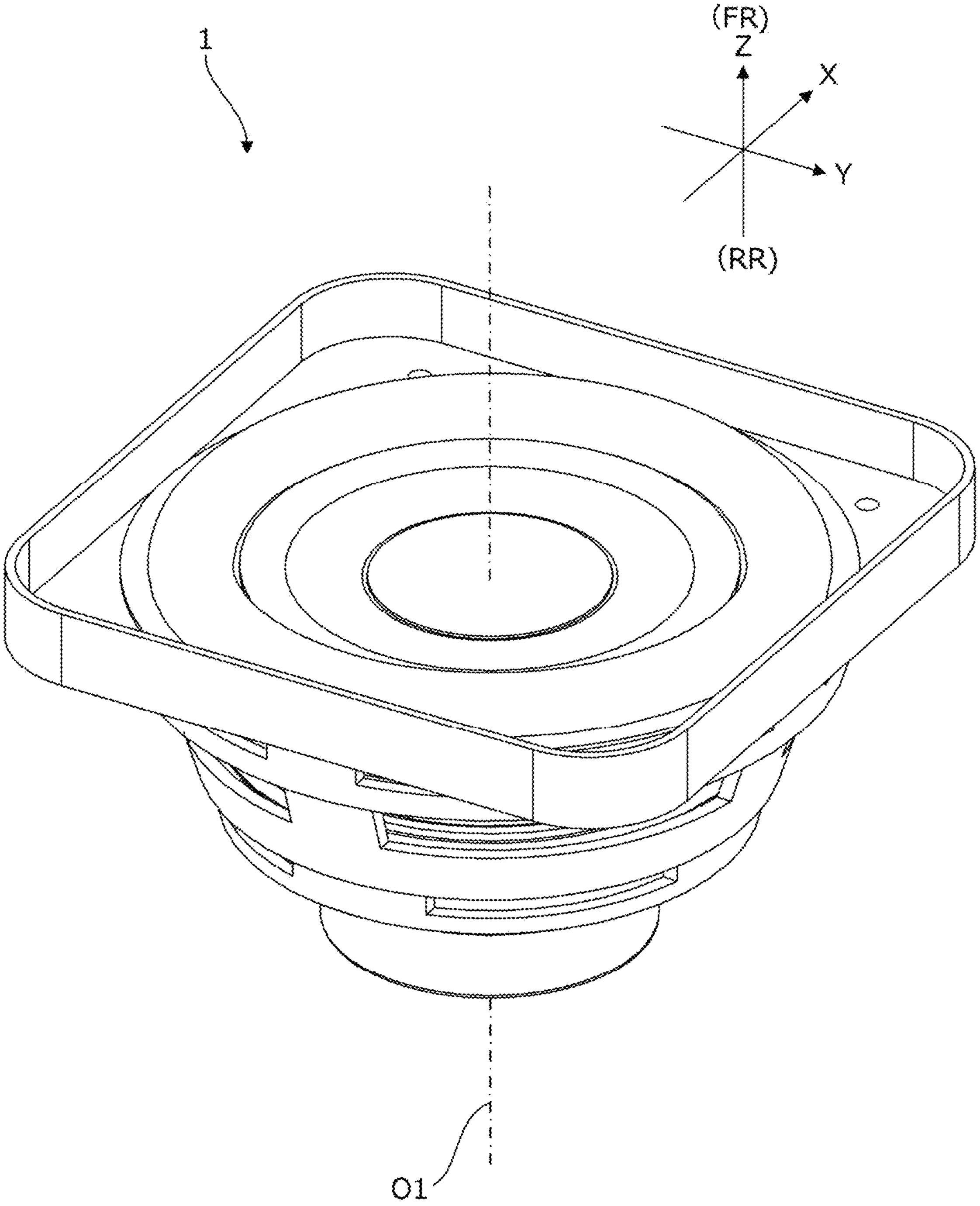
FIG. 1 is a perspective view of a speaker device according to a first embodiment of the present disclosure.
Figure 2:
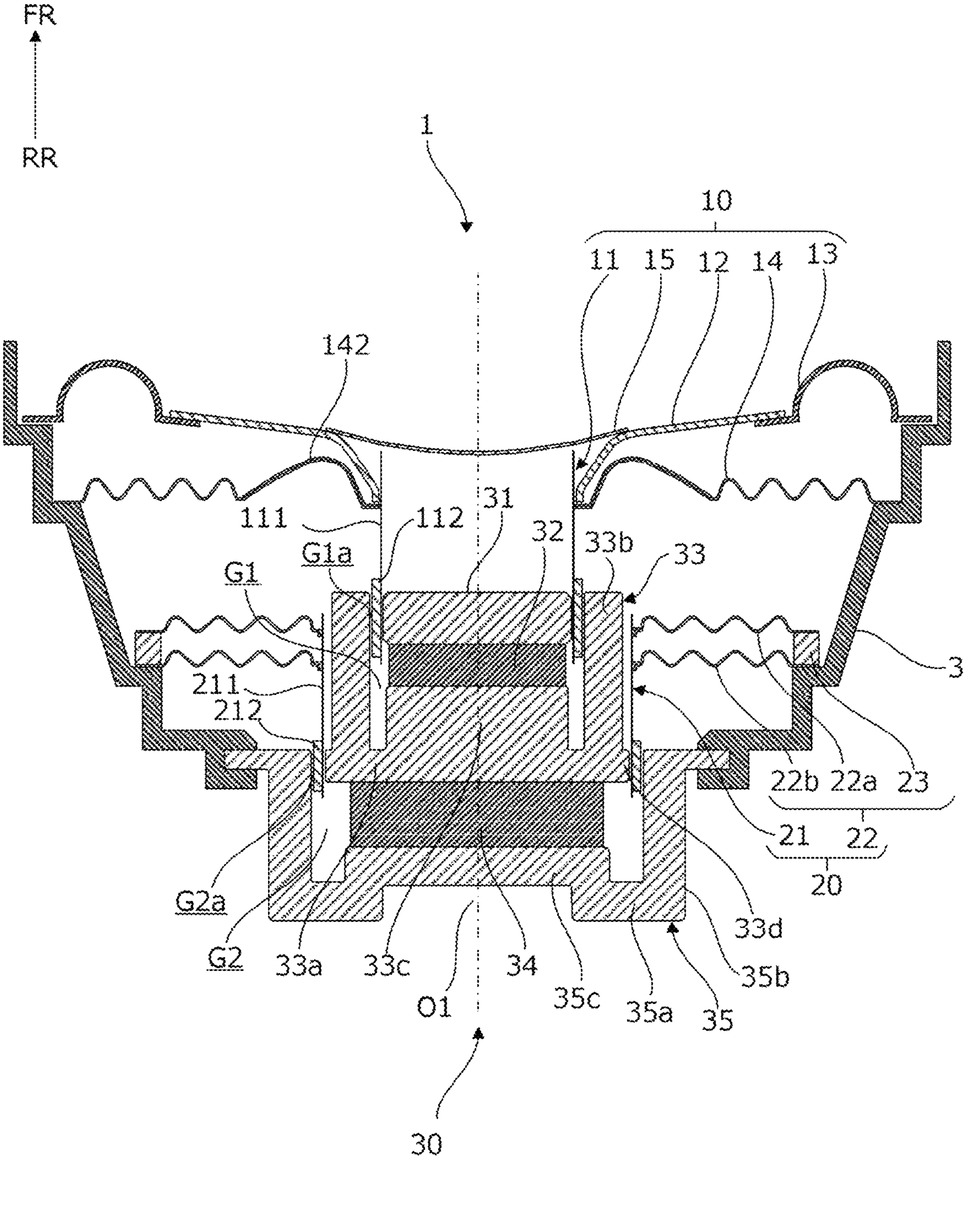
FIG. 2 is a side cross-sectional view of the speaker device according to the first embodiment of the present disclosure.

FIG. 1 is a perspective view of a speaker device 1 according to a first embodiment of the present disclosure. FIG. 2 is a side cross-sectional view of the speaker device 1 taken along an XZ plane passing through a central axis O1. Hereinafter, a configuration of the speaker device 1 according to the first embodiment will be described with reference to the drawings.

The speaker device 1 of the present embodiment is, for example, a speaker mounted on a door of a vehicle, and main parts thereof are axially symmetrical with respect to the central axis O1, as shown in FIG. 2. The speaker device 1 includes a housing (enclosure, not shown), a frame 3 attached to the housing, a first drive unit 10 attached to the frame 3, a second drive unit 20 attached to the frame 3, and a magnetic circuit 30 including a magnetic body and magnets. In the following description, a direction parallel to the central axis O1 is referred to as an axial direction, a direction of the axial direction from the second drive unit 20 toward the first drive unit 10 is referred to as a front direction, and a direction from the first drive unit 10 toward the second drive unit 20 is referred to as a rear direction. Further, a direction that vertically radiates outward from the central axis O1 is referred to as a radial direction. In the speaker device 1, sound is emitted forward from the first drive unit 10. The speaker device 1 is, for example, a woofer or a subwoofer, and can reproduce bass sound with a large input.

The first drive unit 10 includes a first voice coil 11, a diaphragm 12, an edge portion 13, a first damper portion 14, and a center cap 15.

The first voice coil 11 includes a first bobbin 111 having a cylindrical shape coaxial with the central axis O1 and a first coil 112 wound around an outer peripheral surface of the first bobbin 111, and is disposed at a center of the speaker device 1. The diaphragm 12 is a sound emitting member having a circular hole coaxial with the central axis O1 at the center, having a cone shape extending radially outward and forward from an inner peripheral edge of the circular hole, and disposed radially outside the first voice coil 11. The inner peripheral edge of the diaphragm 12 is connected to an outer peripheral surface of the first voice coil 11. An edge portion 13 is formed between an outer peripheral edge of the diaphragm 12 and the frame 3. The edge portion 13 has an annular shape forming a recess having an inverted U-shaped cross section and having an inner peripheral edge overlapping the outer peripheral edge of the diaphragm 12, and an outer peripheral edge thereof is connected to the frame 3.

The first damper portion 14 is an elastic body having a circular hole coaxial with the central axis O1 at the center and having an annular disk shape extending in the radial direction radially outward from an inner peripheral edge thereof where the circular hole is formed, and is disposed radially outside the first voice coil 11 and rearward of the diaphragm 12. Further, the first damper portion 14 has a corrugated shape in a cross section as a whole, and a detailed shape will be described later. The first damper portion 14 has the inner peripheral edge connected to the outer peripheral surface of the first voice coil 11 and an outer peripheral edge connected to the frame 3. The first damper portion 14 couples the first voice coil 11 to the frame 3, and supports the first voice coil 11 such that the first voice coil 11 can vibrate in the direction of the central axis O1. A vibration direction of the first voice coil 11 is the same as the axial direction.

The frame 3 has a concave cross-section whose diameter gradually decreases toward a rear side, and a rear side end portion of the frame 3 is connected to a second yoke 35, which will be described later, of the magnetic circuit 30. The center cap 15, which is a sound emitting member, is disposed at a central portion of the first drive unit 10 so as to cover a part of the first voice coil 11 and the diaphragm 12 near the center. An outer peripheral edge of the center cap 15 is connected to a part of a top surface (front surface) of the diaphragm 12.

The second drive unit 20 includes a second voice coil 21 and a second damper portion 22.

The second voice coil 21 includes a second bobbin 211 having a cylindrical shape coaxial with the central axis O1 and having a larger diameter than the first bobbin 111, and a second coil 212 wound around an outer peripheral surface of the second bobbin 211, and is disposed concentrically with the first voice coil 11 at the center of the speaker device 1 and radially outside the first voice coil 11.

The second damper portion 22 includes two dampers 22*a* and 22*b* as support members, and a spacer 23 for maintaining a distance between the two dampers 22*a* and 22*b* in the axial direction. When it is necessary to distinguish the two dampers 22*a* and 22*b* from each other in the following description, one of the two dampers 22*a* and 22*b* disposed at a position closer to the diaphragm 12 is referred to as the damper 22*a*, and the other damper is referred to as the damper 22*b*. Each of the damper 22*a* and the damper 22*b* is an elastic body having a circular hole coaxial with the central axis O1 at the center and having a disk shape extending in the radial direction radially outward from an inner peripheral edge thereof where the circular hole is formed. The dampers 22*a* and 22*b* are arranged side by side radially outside the second voice coil 21 in the axial direction with the spacer 23 interposed therebetween. Specifically, a rear surface of an outer peripheral edge of the damper 22*a* is connected to a front surface of the spacer 23, and a front surface of an outer peripheral edge of the damper 22*b* is connected to a rear surface of the spacer 23. The inner peripheral edges of the dampers 22*a* and 22*b* are connected to an outer peripheral surface of the second voice coil 21. Further, a rear surface of the outer peripheral edge of the damper 22*b* is connected to the frame 3. The second damper portion 22 is connected to the second voice coil 21 on an inner peripheral side thereof and is connected to the frame 3 on an outer peripheral side thereof, thereby coupling the second voice coil 21 to the frame 3 and supporting the second voice coil 21 such that the voice coil 21 can vibrate in the direction of the central axis O1. A vibration direction of the second voice coil 21 is the same as the axial direction. Each of the dampers 22*a* and 22*b* has a corrugated shape in a cross section, and has the same shape in an attached state (cross-sectional shapes overlap each other when translated in the axial direction). Accordingly, the interval between the damper 22*a* and the damper 22*b* can be set to be small, and an assembling property is improved.

Inner peripheral portions of the diaphragm 12 and the first damper portion 14 are adhered and fixed to an outer peripheral surface of the first bobbin 111 by an adhesive. Outer peripheral portions of the diaphragm 12 and the first damper portion 14 are adhered and fixed to the frame 3 by an adhesive. Inner peripheral portions of the dampers 22*a* and 22*b* of the second damper portion 22 of the second drive unit 20 are adhered and fixed to the outer peripheral surface of the second bobbin 211 by an adhesive. Outer peripheral portions of the dampers 22*a* and 22*b* are adhered and fixed to the frame 3 by an adhesive. Other connection portions of the first drive unit 10 and the second drive unit 20 are also basically adhered and fixed by an adhesive.

The magnetic circuit 30 includes a top plate 31 (first magnetic member), a first magnet 32, a first yoke 33 (intermediate magnetic member), a second magnet 34, and a second yoke 35 (second magnetic member), and is disposed at the center of the speaker device 1 and at a rear side position of the first drive unit 10. These components are coaxially laminated toward the front side in the vibration direction of the first voice coil 11 and the second voice coil 21 in the order of the second yoke 35, which is disposed at a rearmost position, the second magnet 34, the first yoke 33, the first magnet 32, and the top plate 31. The top plate 31, the first yoke 33, and the second yoke 35 are magnetic members. The configuration in which magnetic circuits of the first drive unit 10 and the second drive unit 20 are implemented by one magnetic circuit 30 and the magnetic circuit 30 is laminated from the rear side in this manner improves the assembling property in a manufacturing step. The first magnet 32 and the second magnet 34 are both disposed radially inside the second voice coil 21. In this case, a size of the second magnet 34 in the radial direction is larger than a size of the first magnet 32 in the radial direction. Accordingly, even in the second voice coil 21 having a larger diameter and a larger weight than the first voice coil 11, magnetic flux density of a second magnetic gap G2*a* to be described later can be increased. The sizes of the first magnet 32 and the second magnet 34 in the radial direction may be the same or may be different from those in the embodiment.

The second yoke 35 has a bottomed tubular shape with one end opened, and includes a second bottom portion 35*a* having a disk shape coaxial with the central axis O1, a second tubular portion 35*b* erected from an outer peripheral edge of the second bottom portion 35*a*, and a second convex portion 35*c* having a cylindrical shape protruding forward from a central portion of the second bottom portion 35*a*. In the present embodiment, as shown in FIG. 2, the second yoke 35 is provided with a recess on a bottom surface (rear surface) of the second bottom portion 35*a* for weight reduction and center alignment during processing. The second magnet 34 has a columnar shape coaxial with the central axis O1 and having substantially the same diameter as the second convex portion 35*c*, and is laminated on a top surface (front surface) of the second convex portion 35*c*. An attachment flange is formed on an outer periphery of a front end of the second tubular portion 35*b*, and the attachment flange is coupled to the rear side end portion of the frame 3.

The first yoke 33 basically has a shape obtained by reducing the diameter of the second yoke 35, and includes a first bottom portion 33*a* having a disk shape coaxial with the central axis O1, a first tubular portion 33*b* erected from a peripheral edge of the first bottom portion 33*a*, and a first convex portion 33*c* having a cylindrical shape protruding forward from a central portion of the first bottom portion 33*a*. The first yoke 33 is laminated on a top surface (front surface) of the second magnet 34. The first magnet 32 has a columnar shape coaxial with the central axis O1 and having substantially the same diameter as the first convex portion 33*c*, and is laminated on a top surface (front surface) of the first convex portion 33*c*. The top plate 31 has a columnar shape slightly larger in diameter than the first magnet 32, and is laminated on a top surface (front surface) of the first magnet 32.

The second tubular portion 35*b* extends forward to the vicinity of a top surface (front surface) of the first bottom portion 33*a*. The first bottom portion 33*a* includes a protruding portion 33*d* protruding radially outward from an outer peripheral surface of the first tubular portion 33*b*, that is, toward a second tubular portion 35*b* side.

The first tubular portion 33*b* extends to a top surface (front surface) of the top plate 31. An outer diameter of each of the top plate 31, the first magnet 32, and the first convex portion 33*c* is smaller than an inner diameter of the first tubular portion 33*b*. As shown in FIG. 2, an annular first gap G1 extending from a front-side tip end of the first tubular portion 33*b* to the top surface (front surface) of the first bottom portion 33*a* is formed radially inside the first tubular portion 33*b* between an inner peripheral surface of the first tubular portion 33*b* and outer peripheral surfaces of the top plate 31, the first magnet 32, and the first convex portion 33*c*. In the first gap G1, a substantially uniform magnetic field in a circumferential direction is generated in the first magnetic gap G1*a* defined between the outer peripheral surface of the top plate 31 and the inner peripheral surface of the first tubular portion 33*b*.

Similarly, an outer diameter of each of the first bottom portion 33*a*, the second magnet 34, and the second convex portion 35*c* is smaller than an inner diameter of the second tubular portion 35*b*. As shown in FIG. 2, an annular second gap G2 extending from a tip end of the second tubular portion 35*b* to a top surface (front surface) of the second bottom portion 35*a* is formed radially inside the second tubular portion 35*b* between an inner peripheral surface of the second tubular portion 35*b* and outer peripheral surfaces of the first bottom portion 33*a*, the second magnet 34, and the second convex portion 35*c*. In the second gap G2, a substantially uniform magnetic field in the circumferential direction is generated in the second magnetic gap G2*a* formed by the outer peripheral surface of the first bottom portion 33*a* (an outer peripheral surface of the protruding portion 33*d*) and the inner peripheral surface of the second tubular portion 35*b*. In the present embodiment, by adjusting an protruding amount of the protruding portion 33*d* of the first bottom portion 33*a*, an interval of the second magnetic gap G2*a* can be narrowed, the magnetic flux passing through the second magnetic gap G2*a* can be increased, and a leakage magnetic flux can be reduced.

Figure 3:
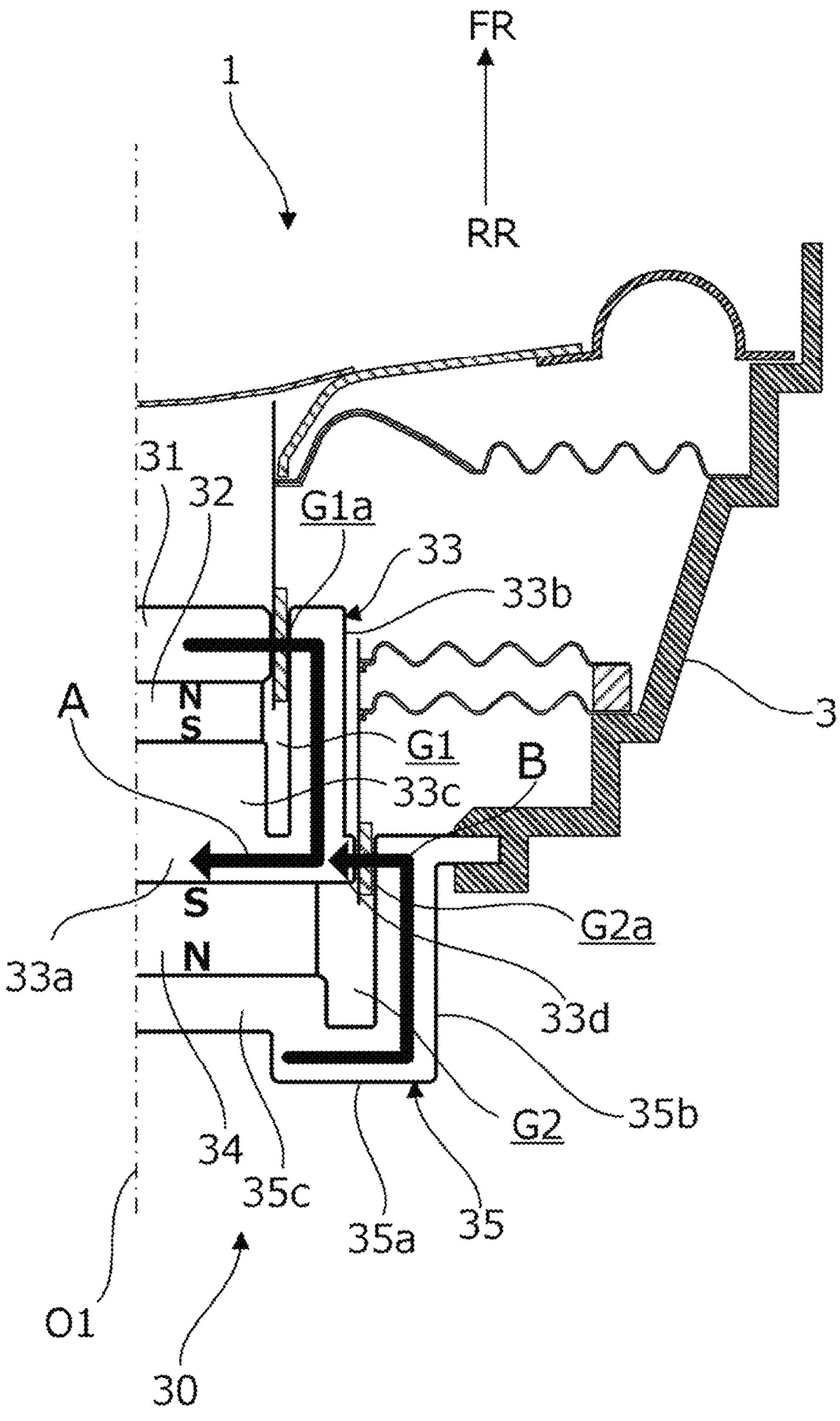
FIG. 3 is an illustrative diagram of an arrangement of magnetized surfaces of magnets and directions of magnetic fields of a magnetic circuit according to the first embodiment of the present disclosure.

FIG. 3 is an illustrative diagram of an arrangement of magnetized surfaces of magnets and directions of magnetic fields of a magnetic circuit according to the first embodiment of the present disclosure. Specifically: this figure is an illustrative diagram of a magnetic polarity arrangement of the magnetized surfaces of the first magnet 32 and the second magnet 34 in a laminated structure of the magnetic circuit 30 and the directions of the magnetic field of the magnetic circuit 30 generated by the arrangement. Note that, in FIG. 3, hatching indicating a cross section of the magnetic circuit 30 is removed to make it easy to see arrows and characters for illustration.

The first magnet 32 and the second magnet 34 are, for example, permanent magnets, and are magnetized in the axial direction. That is, when a circular plate surface (magnetized surface) on one side of the first magnet 32 and the second magnet 34 is an S pole, a circular plate surface (magnetized surface) on the other side is an N pole. As shown in FIG. 3, in the magnetic circuit 30, in a laminated state, the magnetized surface (front magnetized surface, N pole) on the one side of the first magnet 32 is connected to a bottom surface (rear surface) of the top plate 31, and the magnetized surface (rear magnetized surface, S pole) on the other side of the first magnet 32 is connected to the top surface (front surface) of the first convex portion 33*c* of the first yoke 33. The magnetized surface (front magnetized surface, S pole) on one side of the second magnet 34 is connected to a bottom surface (rear surface) of the first bottom portion 33*a* of the first yoke 33, which is a surface different from the surface of the first yoke 33 to which the first magnet 32 is connected, and a magnetized surface (rear magnetized surface, N pole) on the other side of the second magnet 34 is connected to a top surface (front surface) of the second convex portion 35*c* of the second yoke 35. As described above, the magnetic circuit 30 includes the first yoke 33 connected to the first magnet 32 and connected, at a surface different from a surface to which the first magnet 32 is connected, to the second magnet 34. In the speaker device 1 of the first embodiment, the magnetic circuit 30 forms a repulsive magnetic circuit in which the first magnet 32 and the second magnet 34 are arranged such that the same poles (S poles in FIG. 3) face each other in the magnetic circuit manner via the first yoke 33 which is a magnetic member. Magnetic polarities of the first magnet 32 and the second magnet 34 may be reversed so that the N poles face each other. The first magnet 32 and the second magnet 34 may have the same polarity facing each other or may have different polarities facing each other, and magnetization directions thereof are not limited. For example, the magnetization directions of the first magnet 32 and the second magnet 34 may be reversed so that the S pole and the N pole face each other. This is not an exception in a case where either an inner magnetic type or an outer magnetic type is adopted for the magnetic circuit.

As indicated by two arrows A and B in FIG. 3, two magnetic flux flows are generated in the magnetic circuit 30 of the speaker device 1, the two magnetic flux flows being a magnetic flux flow (arrow A) from the top plate 31 through the first magnetic gap G1*a* toward the first tubular portion 33*b* and the first convex portion 33*c* of the first yoke 33, and a magnetic flux flow (arrow B) from the second convex portion 35*c* of the second yoke 35 through the second tubular portion 35*b* and the second magnetic gap G2*a* toward the first bottom portion 33*a* of the first yoke 33. In this case, in the first bottom portion 33*a* which is a portion where the two arrows A and B overlap, since the directions of the magnetic fields are matched, the magnetic fields generated in the first magnetic gap G1*a* and the second magnetic gap G2*a* may be strengthened by using the two magnets (the first magnet 32 and the second magnet 34). Further, since the first bottom portion 33*a* which is a portion where the two arrows A and B can be used also as a plate for forming the second magnetic gap G2*a*, it is possible to achieve thickness reduction and weight reduction and to reduce the number of components.

A part of a rear side of the first bobbin 111 is disposed in the first gap G1, and the first coil 112 is wound around the outer peripheral surface of the rear side disposed at the position of the first magnetic gap G1*a*. The first bobbin 111 is supported by the frame 3 via the first damper portion 14 and can vibrate in the axial direction. Although not shown, the first coil 112 is connected to a signal transmission circuit. Therefore, in the first coil 112, a first driving force (first electromagnetic force) is generated in the axial direction by the action of an electric signal from the signal transmission circuit and the magnetic field of the first magnetic gap. The first bobbin 111 vibrates together with the first coil 112 by the first driving force to vibrate the first drive unit 10. When the diaphragm 12 vibrates together with the first bobbin 111, sound is emitted. At this time, a first vibration force is generated in the speaker device 1 according to the vibration of the first drive unit. The first vibration force is a cause of vibration of the housing fixed to the speaker device 1.

A part of a rear side of the second bobbin 211 is disposed in the second gap G2, and the second coil 212 is wound around the outer peripheral surface of the rear side disposed at the position of the second magnetic gap G2*a*. The second coil 212 is wound in the same direction as the first coil 112. Here, “wound in the same direction” means that a direction of a current flowing through the first coil 112 (clockwise or counterclockwise) is the same as a direction of a current flowing through the second coil 212 when the speaker device 1 is viewed from the front side. The second bobbin 211 is supported by the frame 3 via the second damper portion 22 and can vibrate in the axial direction. The second coil 212 is connected to the same signal transmission circuit as the first coil 112, and a second driving force (second electromagnetic force) is generated in the axial direction by the action of the electric signal from the signal transmission circuit and the magnetic field of the second magnetic gap. The second bobbin 211 vibrates together with the second coil 212 by the second driving force to vibrate the second drive unit 20. At this time, the second vibration force is generated in the speaker device 1 in accordance with the vibration of the second drive unit. Here, since the direction of the magnetic flux in the radial direction of the second magnetic gap is opposite to the direction of the magnetic flux in the radial direction of the first magnetic gap, the second driving force is in an opposite direction to the first driving force in the axial direction in the same period. Accordingly, the first vibration force and the second vibration force are also generated in opposite directions in the axial direction at the same period. Further, in order to make the second vibration force equal to the first vibration force at the same period, the weight is adjusted to be increased or decreased by adding a weight to the second drive unit 20, increasing or decreasing the number of windings of the second coil 212, or setting materials, sizes, or the like of the second voice coil 21 and the dampers 22*a* and 22*b*. Here, the second vibration force being equal to the first vibration force does not need to be strictly the same, and may have a difference to the extent that a cancellation effect is obtained. In this way, the second vibration force is generated in the opposite direction to and equally to the first vibration force in the axial direction, so that the first vibration force is cancelled out and the vibration of the speaker device 1 is suppressed.

The material of each unit in the first drive unit 10 and the second drive unit 20 is not particularly limited. For example, the diaphragm 12, the first damper portion 14, the dampers 22*a* and 22*b*, and the center cap 15 may be made of various materials such as a paper-based, a resin-based, a metal-based material, a composite material obtained by combining these materials, and a ceramic-based material. The edge portion 13 may be made of a high molecular material having relatively high elasticity, such as rubber or a resin. In addition, a fiber material may be used as a material of each unit in the first drive unit 10 and the second drive unit 20. Further, a coating such as a rubber coating may be applied to a material serving as a base in each of the first drive unit 10 and the second drive unit 20. The frame 3 and the spacer 23 may be made of a resin-based material, a paper-based material, or a metal-based material.

The diameters and thicknesses of the members shown in the drawings are merely examples, and the shapes and dimensions are not limited thereto.

In the speaker device 1, a lowest resonance frequency of the second drive unit 20 is set such that the lowest resonance frequency of the second drive unit 20 is the same as a lowest resonance frequency of the first drive unit 10 in a state in which the first drive unit 10 and the second drive unit 20 are accommodated in the housing. The housing may be formed by a part of the vehicle, and a form thereof is not limited. Since the lowest resonance frequency of the second drive unit 20 is generally higher when the speaker device 1 is accommodated in the housing, the lowest resonance frequency of the second drive unit 20 is set to be lower than the lowest resonance frequency of the first drive unit 10 when the speaker device 1 is in a single state. Here, “the lowest resonance frequency of the second drive unit 20 is the same as the lowest resonance frequency of the first drive unit 10” does not need to be strictly the same, and the lowest resonance frequency of the second drive unit 20 may be within a constant range before and after the lowest resonance frequency of the first drive unit 10, for example, within a range of ±20%. Since the lowest resonance frequency of the first drive unit 10 and the lowest resonance frequency of the second drive unit 20 are the same, it is possible to more reliably prevent the resonance occurring in the housing.

Figure 4:
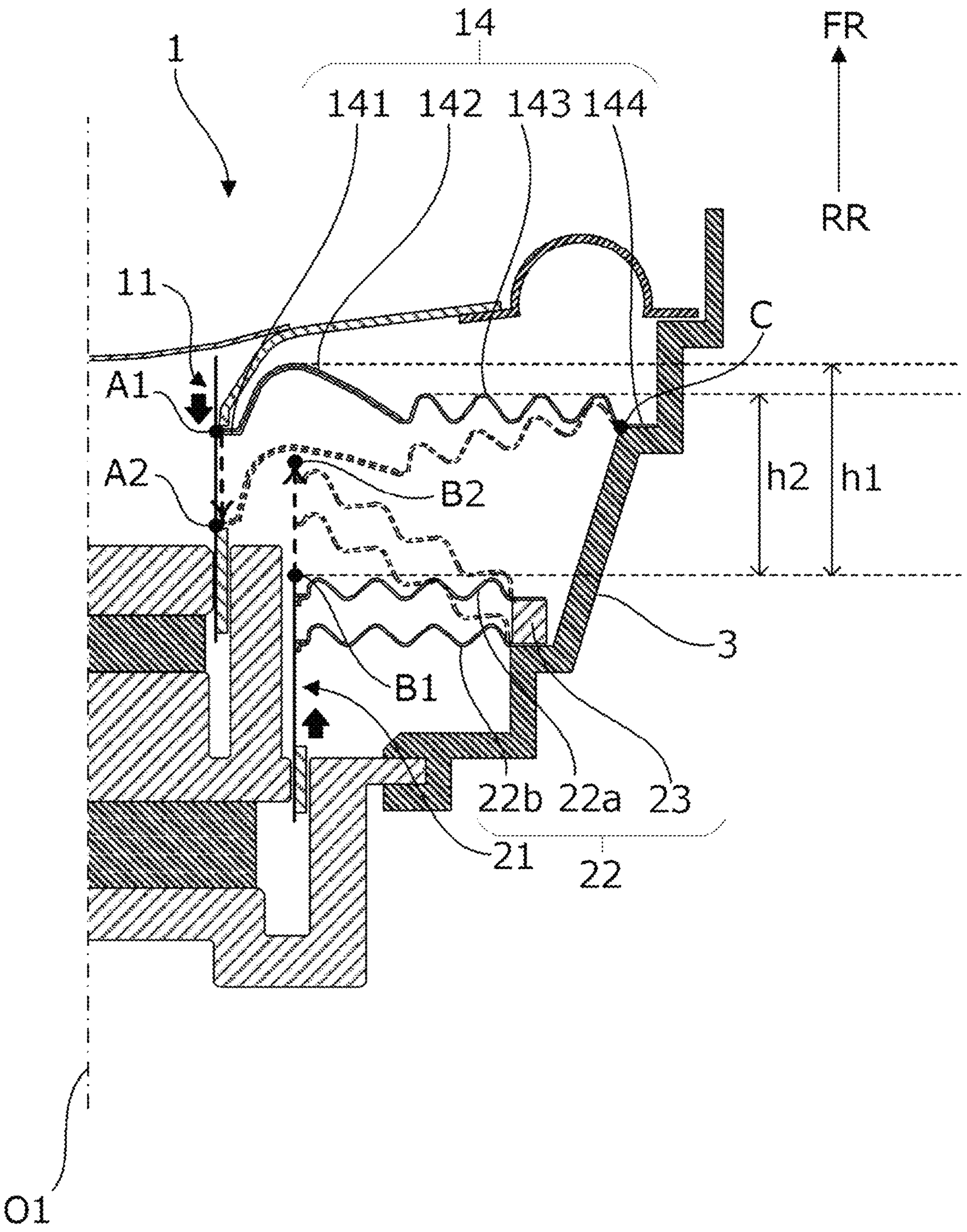
FIG. 4 is an illustrative diagram of amplitude of drive units of the speaker device according to the first embodiment of the present disclosure.

FIG. 4 is an illustrative diagram of amplitude of dampers of the speaker device according to the first embodiment of the present disclosure. Hereinafter, details of the first damper portion 14 and a positional relationship when the first damper portion 14 and the second voice coil 21 are closest to each other will be described with reference to the same figure.

The shape and the like of the first damper portion 14 will be described. The first damper portion 14 includes an inner peripheral portion 141, a recessed portion 142, an intermediate portion 143, and an outer peripheral portion 144. The inner peripheral portion 141 is connected to the outer peripheral surface of the first bobbin 111, and the outer peripheral portion 144 is connected to the frame 3. The recessed portion 142 is disposed to face the second voice coil 21 in the axial direction, and has a shape that is largely recessed when a front side in the axial direction is viewed from a second voice coil 21 side. The intermediate portion 143 has a so-called corrugated shape having a corrugated cross section.

When the first drive unit 10 and the second drive unit 20 are at an intermediate point of the amplitude (or in a state in which no electric signal is applied), the recessed portion 142 is separated from the second voice coil 21 more than the intermediate portion 143, which is the other portion of the first damper portion 14, on an extension line of the vibration direction of the second voice coil 21. Specifically, as shown in FIG. 4, when a plane perpendicular to the axial direction including a position B1 indicating a front-side tip end of the second voice coil 21 is set as a reference, a distance h1 to a plane perpendicular to the axial direction including a front-side tip end of the recessed portion 142 is larger than a distance h2 to a plane perpendicular to the axial direction including a front-side tip end of the intermediate portion 143.

The recessed portion 142 has higher rigidity than the intermediate portion 143, which is the other portion of the first damper portion 14. For example, the thickness can be increased and the rigidity can be increased by forming a double structure in which a reinforcing member having the same shape is laminated only on the recessed portion 142. The material of the reinforcing member may be the same as or different from that of the recessed portion 142. Accordingly, the recessed portion 142 is less likely to be deformed than other portions such as the intermediate portion 143. Further, the rigidity may be increased by adding a rib or the like to the recessed portion 142, or the rigidity may be increased by forming the recessed portion 142 with a material having higher rigidity than the intermediate portion 143.

Next, a positional relationship when the first damper portion 14 and the second voice coil 21 are closest to each other will be described. When the first drive unit 10 and the second drive unit 20 are at the intermediate point of the amplitude, a connection point between the first damper portion 14 and the first voice coil 11 is at a position A1 shown in FIG. 4, and the front-side tip end of the second voice coil 21 is at the position B1. When electric signals are applied to the first voice coil 11 and the second voice coil 21 and the first damper portion 14 and the second voice coil 21 are closest to each other, the connection point between the first damper portion 14 and the first voice coil 11 is at the position A2, and the front-side tip end of the second voice coil 21 is at the position B2. That is, the front-side tip end, which is a part of the second voice coil 21, is located in the recessed portion 142 when the first damper portion 14 and the second voice coil 21 are closest to each other. It can be seen that at this time, the first damper portion 14 and the second damper portion 22 are located at positions indicated by broken lines in FIG. 4, the front-side tip end of the second voice coil 21 is not in contact with the recessed portion 142, and the first drive unit 10 and the second drive unit 20 do not interfere with each other. The recessed portion 142 is designed to not interfere with the diaphragm 12.

In the speaker device 1 configured as described above, by making a diameter of the second voice coil 21 closer to a diameter of the first voice coil 11, the magnetic circuit 30 that generates a magnetic field that vibrates the first drive unit 10 and the second drive unit 20 can be accommodated in the frame 3 and can be formed into a laminated structure in the axial direction (vibration direction), and the assembling property at the time of manufacturing is improved. Further, by making the diameter of the second voice coil 21 closer to the diameter of the first voice coil 11, lengths of the first damper portion 14 and the second damper portion 22 in the radial direction become equal to each other, and the second voice coil 21 can also ensure the amplitude amount equal to that of the first voice coil 11. That is, in the second drive unit 20, it is possible to generate a sufficient damping force for canceling out the vibration (vibration force) transmitted from the first drive unit 10 to the entire speaker device 1 via the frame 3. Accordingly, vibration-damping characteristics are improved while maintaining the quality of voice, particularly, bass sound reproduction.

Further, since the repulsive magnetic circuit includes the first magnet 32 and the second magnet 34, the magnetic flux density of the first magnetic gap G1*a* and the second magnetic gap G2*a* is increased compared to the case where only the first magnet 32 is provided, and responsiveness to the electric signals of the first drive unit 10 and the second drive unit 20 is improved. Further, the first bottom portion 33*a* of the first yoke 33 disposed between the two magnets can be used as both paths for the magnetic flux passing through the first magnetic gap G1*a* and the magnetic flux passing through the second magnetic gap G2*a*, and the thickness reduction of the magnetic circuit 30 can be achieved.

Further, although outer peripheral sides of the first drive unit 10 and the second drive unit 20 are fixed to the frame 3, since inner peripheral sides vibrate together with the first voice coil 11 and the second voice coil 21, an amount of back and forth movement increases toward the radially inside. In this case, as the second voice coil 21 vibrating back and forth is located on the more outer peripheral side, when the amplitude of the first voice coil 11 and the second voice coil 21 is maximized, the second voice coil 21 is less likely to interfere with the first damper portion 14 and the diaphragm 12. On the other hand, as the diameter of the second voice coil 21 is closer to the diameter of the first voice coil 11, that is, as the second voice coil 21 is located on the more inner peripheral side, when the amplitudes of the first voice coil 11 and the second voice coil 21 are maximized, the second voice coil 21 is more likely to interfere with the first damper portion 14 and the diaphragm 12. In contrast, since the first damper portion 14 includes the recessed portion 142, even when the second voice coil 21 is disposed adjacent to the first voice coil 11, the second voice coil 21 does not interfere with the first damper portion 14 or the diaphragm 12. Accordingly, the second voice coil 21 can also be reduced in thickness while ensuring the amplitude amount equal to that of the first voice coil 11 and improving the audio quality. Since the recessed portion 142 has high rigidity and is less likely to be deformed, it is possible to reliably avoid being in contact with the second voice coil 21 without deviating a relative position with the second voice coil 21. Further, since the first bottom portion 33*a* of the first yoke 33 can also be used as the plate for forming the second magnetic gap G2*a*, it is possible to achieve the thickness reduction and the weight reduction by reducing the number of components. In addition, since the first magnet 32 and the second magnet 34 are laminated radially inside the second voice coil 21, the size of the second magnet 34 can be reduced to a minimum necessary size and the weight reduction can be achieved.

As described above, the speaker device 1 according to the first embodiment has good assembling property at the time of manufacturing, and can improve the vibration-damping characteristics while maintaining the quality of sound, particularly, bass sound reproduction. Further, it is possible to achieve both improvement in the vibration-damping characteristics and the thickness reduction.

Second Embodiment

In the speaker device 1 of the first embodiment, both the first magnet 32 and the second magnet 34 are disposed radially inside the second voice coil 21, but in a speaker device 2 of a second embodiment, a second magnet 134 is formed in an annular shape and is disposed radially outside the second voice coil 21.

Figure 5:
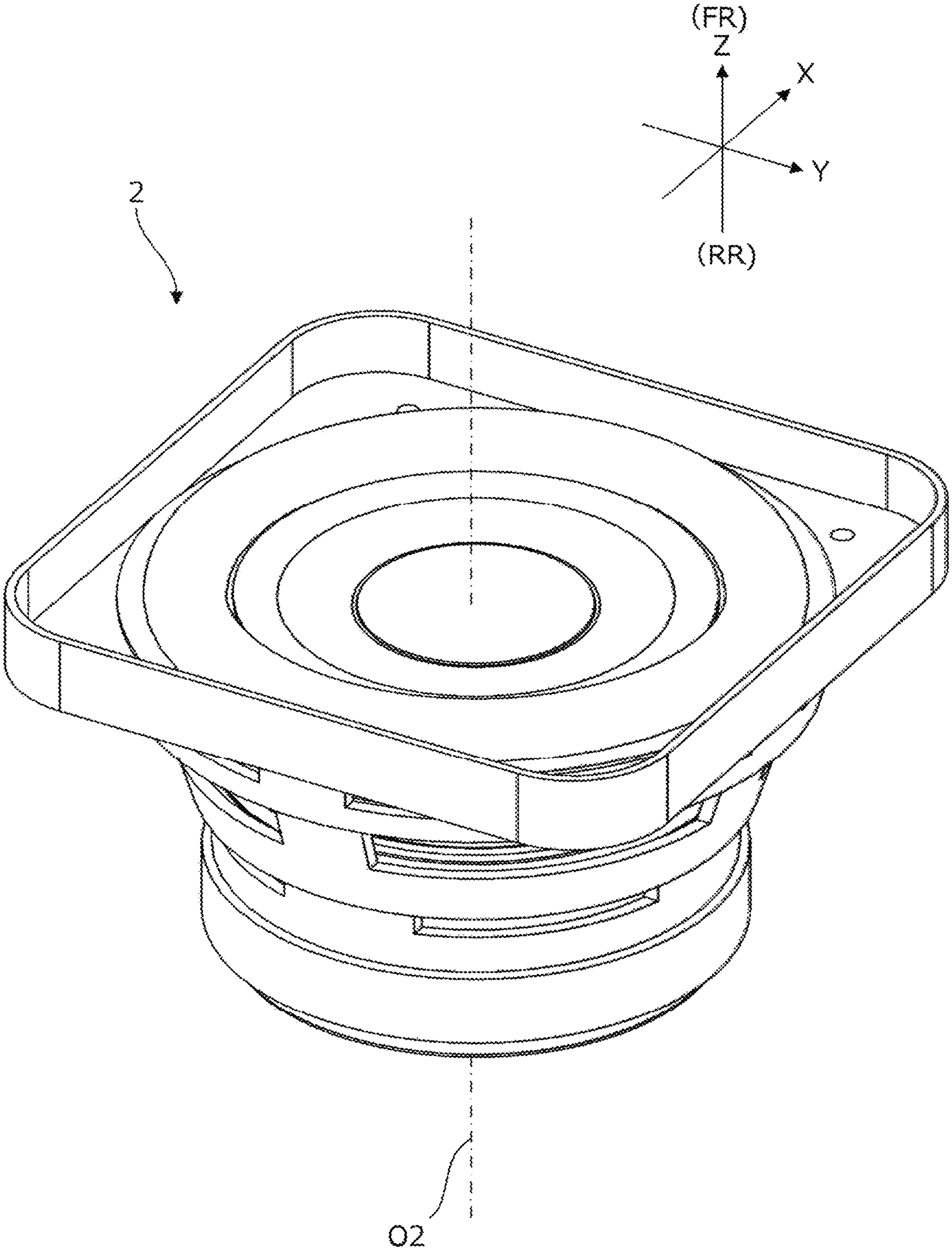
FIG. 5 is a perspective view of a speaker device according to a second embodiment of the present disclosure.
Figure 6:
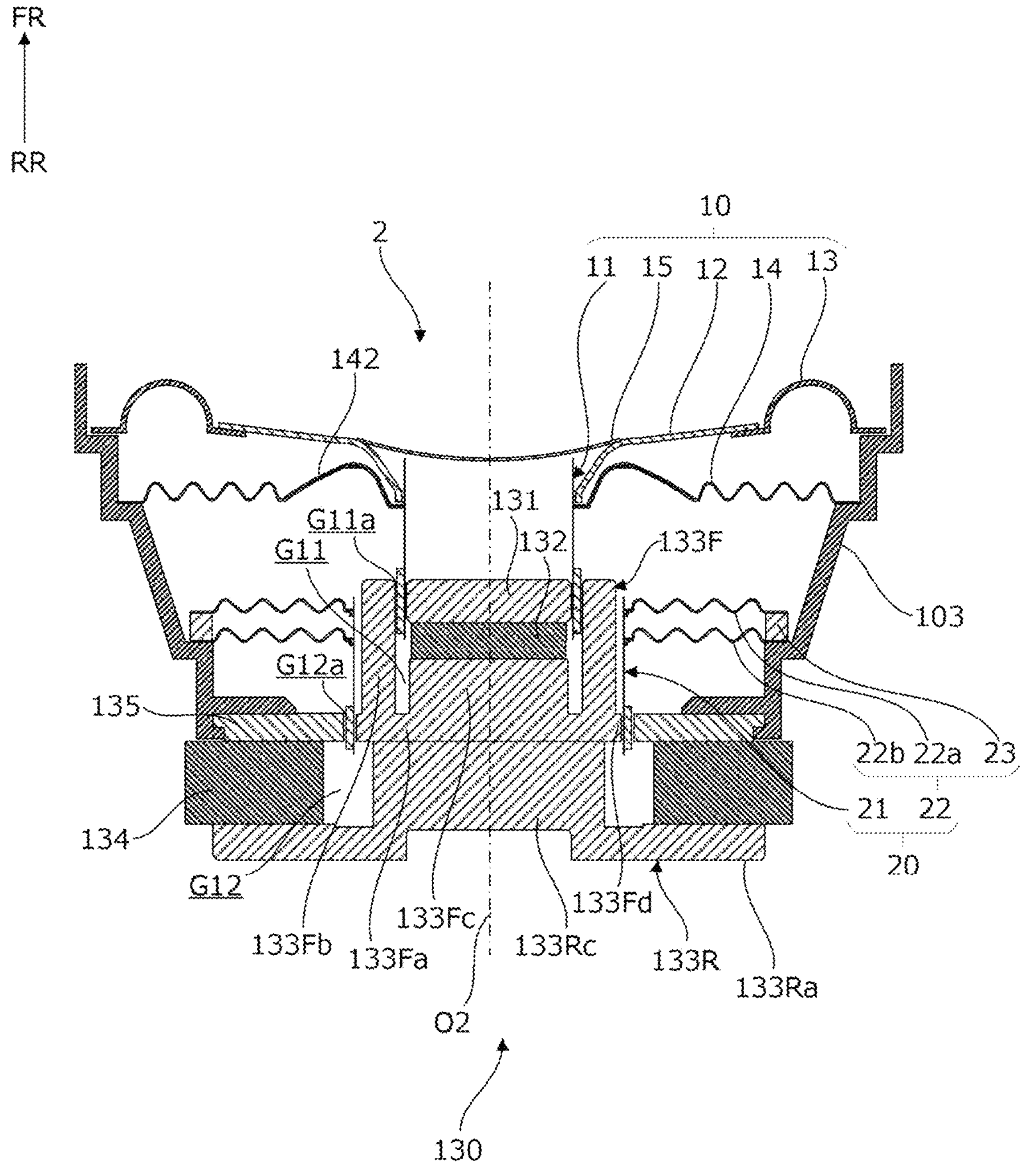
FIG. 6 is a side cross-sectional view of the speaker device according to the second embodiment of the present disclosure.

FIG. 5 is a perspective view of the speaker device 2 according to the second embodiment, and FIG. 6 is a side cross-sectional view taken along an XZ plane including a central axis O2 of the speaker device 2. Hereinafter, the speaker device 2 according to the second embodiment will be described with reference to the drawings. The same components as those of the speaker device 1 according to the first embodiment are denoted by the same reference numerals, and description thereof will be omitted.

The speaker device 2 of the present embodiment is a cone type speaker, and a main portion thereof is axially symmetrical with respect to the central axis O2 as shown in FIG. 6. In the following description, a direction parallel to the central axis O2 is defined as an axial direction, and a front-rear direction and a radial direction are defined as in the first embodiment. The speaker device 2 emits sound forward from the first drive unit 10. The speaker device 2 is, for example, a woofer or a subwoofer, and can reproduce bass sound with a large input.

A frame 103 has a concave cross section whose diameter gradually decreases toward a rear side, and a rear side end portion of the frame 103 is connected to a second top plate 135, which will be described later, of a magnetic circuit 130. The magnetic circuit 130 includes a first top plate 131 (first magnetic member), a first magnet 132, a first yoke 133F and a second yoke 133R (intermediate magnetic member), the second magnet 134, and the second top plate 135 (second magnetic member). The first magnet 132 is disposed radially inside the second voice coil 21, and the second magnet 134 is disposed radially outside the second voice coil 21. Therefore, in a radially central portion of the speaker device 2, each component is laminated coaxially toward a front side in the vibration direction of the first voice coil 11 and the second voice coil 21 in the order of the second yoke 133R, which is disposed at a rearmost position, the first yoke 133F, the first magnet 132, and the first top plate 131. Further, in a radially outer side of the speaker device 2, each component is laminated coaxially toward the front side in the vibration direction of the first voice coil 11 and the second voice coil 21 in the order of the second yoke 133R, which is disposed at the rearmost position, the second magnet 134, and the second top plate 135. The configuration in which the magnetic circuit 130 is laminated from the rear side in this manner improves an assembling property in a manufacturing step. The first top plate 131, the first yoke 133F, the second yoke 133R, and the second top plate 135 are magnetic members. The first yoke 133F and the second yoke 133R are formed of, for example, the same material and are connected to each other, and thus act as an integral magnetic member (hereinafter, referred to as an intermediate magnetic member 133). Sizes of an inner diameter and an outer diameter of the second magnet 134 in the radial direction are larger than a size of an outer diameter of the first magnet 132 in the radial direction. Accordingly, magnetic flux density of a second magnetic gap G12*a* acting on the second voice coil 21 having a larger diameter and a larger weight than the first voice coil 11 can be increased. The first magnet 132 and the second magnet 134 may have a size relationship different from that of the embodiment. In particular, in the second embodiment, there is a space in the radial direction as compared with the first embodiment, and it is easy to enlarge the second magnet 134. Therefore, it is also possible to use a magnet having a smaller magnetic force than the magnets of the first embodiment at low cost.

The second yoke 133R includes a second bottom portion 133Ra having a disk shape coaxial with the central axis O2, and a second convex portion 133Rc having a cylindrical shape protruding forward from a central portion of the second bottom portion 133Ra. In the present embodiment, as shown in FIG. 6, the second yoke 133R is provided with a recess on a bottom surface (rear surface) of the second bottom portion 133Ra for weight reduction and center alignment during processing. The second magnet 134 has an annular disk shape coaxial with the central axis O2 and having the inner diameter larger than the outer diameter of the second convex portion 133Rc and the outer diameter slightly larger than the outer diameter of the second bottom portion 133Ra, and is laminated on a top surface (front surface) on an outer peripheral side of the second bottom portion 133Ra. The second top plate 135 has an annular disk shape having the inner diameter larger than an outer diameter of the first yoke 133F and the outer diameter slightly smaller than the outer diameter of the second magnet 134, and is laminated on a top surface (front surface) of the second magnet 134.

The first yoke 133F includes a first bottom portion 133Fa having a disk shape coaxial with the central axis O2, a first tubular portion 133Fb erected from a peripheral edge of the first bottom portion 133Fa, and a first convex portion 133Fc having a cylindrical shape protruding forward from a central portion of the first bottom portion 133Fa. The first yoke 133F is laminated on a top surface (front surface) of the second convex portion 133Rc. The first magnet 132 has a columnar shape coaxial with the central axis O2 and having substantially the same diameter as the first convex portion 133Fc, and is laminated on a top surface (front surface) of the first convex portion 133Fc. The first top plate 131 has a columnar shape slightly larger in diameter than the first magnet 132, and is laminated on a top surface (front surface) of the first magnet 132.

The second top plate 135 has a length (thickness) in the axial direction substantially equal to a length (thickness) in the axial direction of the first bottom portion 133Fa, and is disposed adjacent to a radially outer side of the first bottom portion 133Fa. The first bottom portion 133Fa includes a protruding portion 133Fd protruding radially outward from an outer peripheral surface of the first tubular portion 133Fb, that is, toward a second top plate 135 side. An attachment flange is formed on an outer periphery of a front end of the second top plate 135, and the attachment flange is coupled to the rear side end portion of the frame 103.

The first tubular portion 133Fb extends to a top surface (front surface) of the first top plate 131. An outer diameter of each of the first top plate 131, the first magnet 132, and the first convex portion 133Fc is smaller than an inner diameter of the first tubular portion 133Fb. Therefore, as shown in FIG. 6, an annular first gap G11 extending from a front-side tip end of the first tubular portion 133Fb to a top surface (front surface) of the first bottom portion 133Fa is formed radially inside the first tubular portion 133Fb between an inner peripheral surface of the first tubular portion 133Fb and outer peripheral surfaces of the top plate 131, the first magnet 132, and the first convex portion 133Fc. In the first gap G11, a substantially uniform magnetic field in a circumferential direction is generated in a first magnetic gap G11*a* defined by the outer peripheral surface of the first top plate 131 and the inner peripheral surface of the first tubular portion 133Fb.

An outer diameter of each of the first bottom portion 133Fa and the second convex portion 133Rc is smaller than the inner diameter of the second magnet 134 and an inner diameter of the second top plate 135. Therefore, as shown in FIG. 6, an annular second gap G12 is formed which is surrounded by the first bottom portion 133Fa, the second convex portion 133Rc, the second convex portion 133Rc, the second bottom portion 133Ra, the second magnet 134, and the second top plate 135 and extends from a front-side tip end of the second top plate 135 to a top surface (front surface) of the second bottom portion 133Ra. In the second gap G12, a substantially uniform magnetic field in the circumferential direction is generated in the second magnetic gap G12*a* formed by an outer peripheral surface of the first bottom portion 133Fa and an inner peripheral surface of the second top plate 135. In the present embodiment, an interval of the second magnetic gap G12*a* is narrowed by adjusting a protruding amount of the protruding portion 133Fd of the first bottom portion 133Fa. Accordingly, a magnetic flux passing through the second magnetic gap G12*a* can be increased, and a leakage magnetic flux can be reduced.

Figure 7:
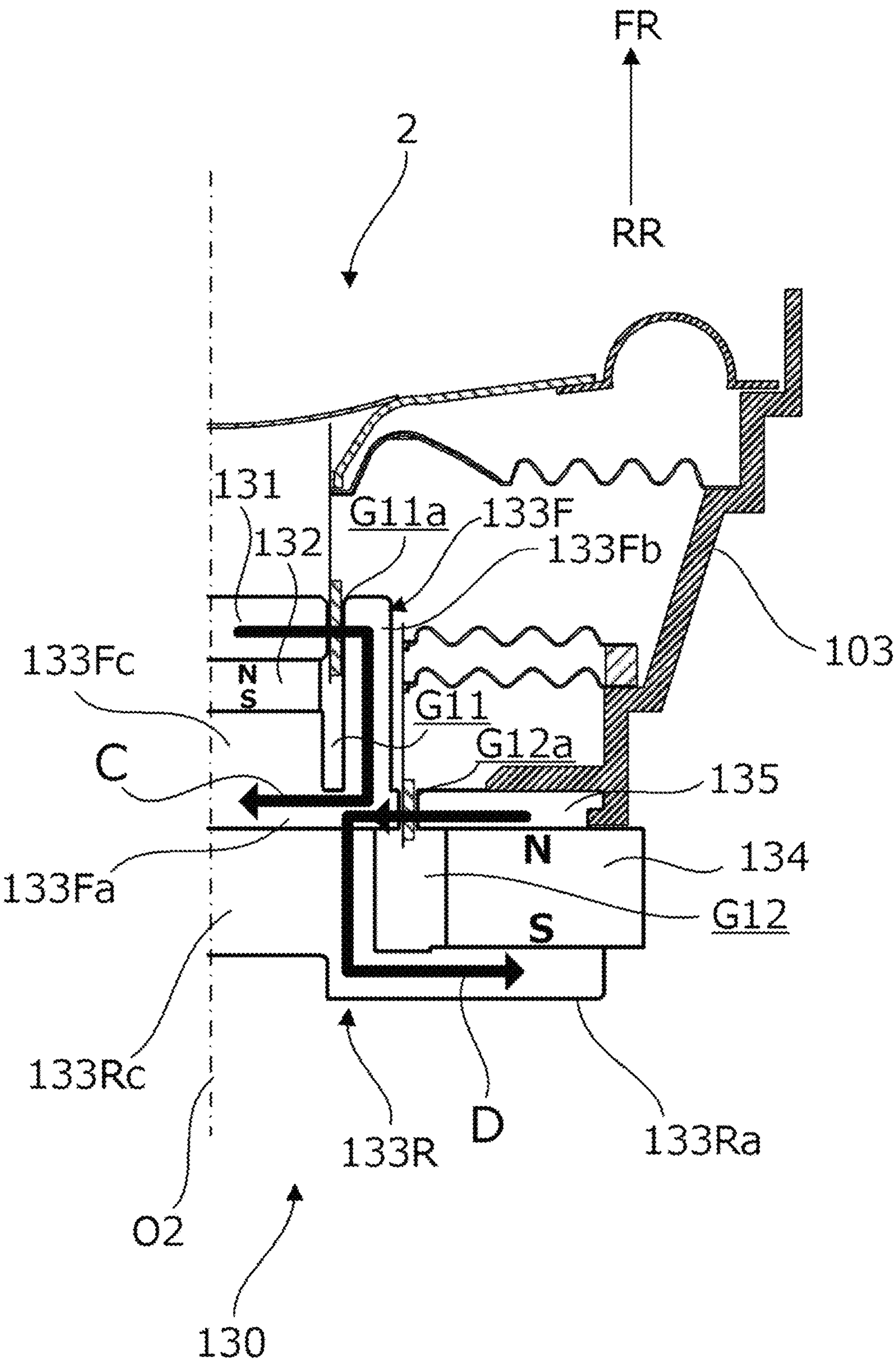
FIG. 7 is an illustrative diagram of an arrangement of magnetized surfaces of magnets and a direction of a magnetic field of a magnetic circuit according to the second embodiment of the present disclosure.

FIG. 7 is an illustrative diagram of an arrangement of magnetized surfaces of magnets and directions of magnetic fields of a magnetic circuit according to the second embodiment of the present disclosure. Specifically, this figure is an illustrative diagram of a magnetic polarity arrangement of the magnetized surfaces of the first magnet 132 and the second magnet 134 in a laminated structure of the magnetic circuit 130 and the directions of the magnetic field of the magnetic circuit 130 generated by the arrangement.

The first magnet 132 and the second magnet 134 are, for example, permanent magnets, and are magnetized in the axial direction. That is, when a circular plate surface on one side of the first magnet 132 and the second magnet 134 is an S pole, a circular plate surface on the other side is an N pole. As shown in FIG. 7, in the magnetic circuit 130, in a laminated state, the magnetized surface (front magnetized surface, N pole) on the one side of the first magnet 132 is connected to a bottom surface (rear surface) of the first top plate 131, and the magnetized surface (rear magnetized surface, S pole) on the other side of the first magnet 132 is connected to the top surface (front surface) of the first convex portion 133Fc of the first yoke 133F, that is, the intermediate magnetic member. A magnetized surface (rear magnetized surface, S pole) on one side of the second magnet 134 is connected to the top surface (front surface) on the outer peripheral side of the second bottom portion 133Ra of the second yoke 133R, which is a surface different from the surface of the intermediate magnetic member to which the first magnet 132 is connected, and a magnetized surface (front magnetized surface, N pole) on the other side of the second magnet 134 is connected to a bottom surface (rear surface) of the second top plate 135. As described above, in the speaker device 2 according to the second embodiment, the magnetic circuit 130 forms a repulsive magnetic circuit in which the first magnet 132 and the second magnet 134 are disposed so that the same poles (S poles in FIG. 7) face each other in a magnetic circuit via the magnetic members of three layers (the first top plate 131, the intermediate magnetic member including the first yoke 133F and the second yoke 133R, and the second top plate 135). Magnetic polarities of the first magnet 132 and the second magnet 134 may be reversed so that the N poles face each other. The first magnet 132 and the second magnet 134 may have the same polarity facing each other or may have different polarities facing each other, and magnetization directions thereof are not limited. For example, the magnetization directions of the first magnet 132 and the second magnet 134 may be reversed so that the S pole and the N pole face each other. This is not an exception in a case where either an inner magnetic type or an outer magnetic type is adopted for the magnetic circuit.

As indicated by two arrows C and D in FIG. 7, two magnetic flux flows are generated in the magnetic circuit 130 of the speaker device 2, the two magnetic fluxes being a magnetic flux flow (arrow C) from the first top plate 131 through the first magnetic gap G11*a* toward the first tubular portion 133Fb and the first bottom portion 133Fa of the first yoke 133F, and a magnetic flux flow (arrow D) from the second top plate 135 through the second magnetic gap G12*a* toward the first bottom portion 133Fa, the second convex portion 133Rc, and the second bottom portion 133Ra. In particular, in a portion where the two arrows C and D overlap, since the magnetic field directions are matched, the magnetic fields generated in the first magnetic gap G11*a* and the second magnetic gap G12*a* may be strengthened by using the two magnets (the first magnet 132 and the second magnet 134). In this case, the flow direction of the magnetic flux in the first magnetic gap G11*a* and the flow direction of the magnetic flux in the second magnetic gap G12*a* are opposite to each other in the radial direction as in the first embodiment.

In the speaker device 2 configured as described above, since a diameter of the second voice coil 21 is made closer to a diameter of the first voice coil 11, the magnetic circuit 130 constituting the first drive unit 10 and the second drive unit 20 is accommodated in the frame 103 and has a laminated structure in the axial direction (vibration direction), and the assembling property at the time of manufacturing is improved. Further, by making the diameter of the second voice coil 21 closer to the diameter of the first voice coil 11, the lengths of the first damper portion 14 and the second damper portion 22 in the radial direction become equal to each other, and the second voice coil 21 can also secure the amplitude amount equal to that of the first voice coil 11. That is, in the second drive unit 20, it is possible to generate a sufficient damping force for canceling out the vibration (vibration force) transmitted from the first drive unit 10 to the entire speaker device 2 via the frame 103. Accordingly, vibration-damping characteristics are improved while maintaining the quality of voice, particularly, bass sound reproduction.

Further, since the repulsive magnetic circuit includes the first magnet 132 and the second magnet 134, the magnetic flux density of the first magnetic gap G11*a* and the second magnetic gap G12*a* is increased compared to the case where only the first magnet 132 provided, and responsiveness to the electric signals of the first drive unit 10 and the second drive unit 20 is improved. Further, since the first bottom portion 133Fa disposed between the two magnets can be used as both paths for the magnetic flux passing through the first magnetic gap G11*a* and the magnetic flux passing through the second magnetic gap G12*a*, the diameter of the second voice coil 21 can be made close to the diameter of the first voice coil 11 while the first voice coil 11 is disposed at a more central position to take a sufficient amplitude amount. At the same time, the number of components of the magnetic circuit 130 can be reduced and a thickness reduction of the magnetic circuit 130 can be achieved.

Further, although outer peripheral sides of the first drive unit 10 and the second drive unit 20 are fixed to the frame 103, since inner peripheral sides vibrate together with the first voice coil 11 and the second voice coil 21, an amount of back and forth movement increases toward the inside. In this case, as the second voice coil 21 vibrating back and forth is located on the more outer peripheral side, when the amplitude of the first voice coil 11 and the second voice coil 21 is maximized, the second voice coil 21 is less likely to interfere with the first damper portion 14 and the diaphragm 12. On the other hand, as the diameter of the second voice coil 21 is closer to the diameter of the first voice coil 11, that is, as the second voice coil 21 is located on the more inner peripheral side, when the amplitudes of the first voice coil 11 and the second voice coil 21 are maximized, the second voice coil 21 is more likely to interfere with the first damper portion 14 and the diaphragm 12. In contrast, since the first damper portion 14 includes the recessed portion 142, even when the second voice coil 21 is disposed adjacent to the first voice coil 11, the second voice coil 21 does not interfere with the first damper portion 14 or the diaphragm 12. Accordingly, the second voice coil 21 can also be reduced in thickness while ensuring the amplitude amount equal to that of the first voice coil 11 and improving the audio quality. Since the recessed portion 142 has high rigidity and is less likely to be deformed, it is possible to reliably avoid being in contact with the second voice coil 21 without deviating a relative position with the second voice coil 21. Further, since the first bottom portion 133Fa can also be used as a plate for forming the second magnetic gap G12*a*, it is possible to achieve the thickness reduction and the weight reduction by reducing the number of components.

Further, as shown in FIG. 7, in a state in which the first magnet 132 and the second magnet 134 are disposed, the magnetization directions in the axial direction are the same. Therefore, after the magnetic circuit 130 is assembled in the manufacturing step, magnetizing processing of the first magnet 132 and the second magnet 134 can be simultaneously performed.

As described above, the speaker device 2 of the second embodiment has good assembling property at the time of manufacturing, and can improve the vibration-damping characteristics while maintaining the quality of sound reproduction. Further, it is possible to achieve both improvement in the vibration-damping characteristics and the thickness reduction.

Although the first and second embodiments of the present disclosure have been described above, aspects of the present disclosure are not limited to these embodiments.

For example, an installation location of the speaker device is not limited to the vehicle.

In the above embodiment, the first damper portion 14 and the second damper portion 22 each have a so-called corrugated shape having a corrugated cross section and may have another shape. For example, a plate spring or the like may be used, or a single arc shape may be used instead of the corrugated shape. In the above embodiment, the dampers 22*a* and 22*b* of the second damper portion 22 are the same in the attached state, but may have a shape that is reversed in the axial direction in the attached state. Accordingly, since the movement symmetry and the linearity of the second voice coil 21 at the time of front-rear amplitude are improved, stresses applied to the dampers 22*a* and 22*b* become equal, and a support strength of the second voice coil 21 can be improved. Further, since the linearity of the second voice coil 21 is improved, the interval of the second magnetic gap G12*a* can be further narrowed to strengthen the magnetic field.

In the above embodiment, the second damper portion 22 includes the two dampers 22*a* and 22*b*, but it may be composed of one damper. Further, three or more dampers may be provided. By configuring the second damper portion 22 with the plurality of dampers, stress applied to each damper is equal, so that the movement symmetry and the linearity of the second voice coil 21 at the time of the front-rear amplitude are improved, and the support strength of the second voice coil 21 can be improved. Further, since the linearity of the second voice coil 21 is improved, the interval of the second magnetic gap G12*a* can be further narrowed to strengthen the magnetic field. Further, in the case where the second damper portion 22 includes the plurality of dampers, in the above embodiment, the spacer 23 was used to indirectly fix the dampers to the frames 3 and 103 while keeping the interval in the axial direction of the dampers, but outer peripheral sides of the plurality of dampers may be directly connected and fixed to the frames 3 and 103 with an adhesive or the like.

In the above embodiment, the first coil 112 and the second coil 212 are connected to the same signal circuit and the same electric signal is input to the first coil 112 and the second coil 212, but the second coil 212 may be connected to another signal circuit and an electric signal different from that of the first coil 112 is input. For example, a first electric signal that generates a first driving force that vibrates the first voice coil 11 may be input to the first coil 112, and a second electric signal that generates a second driving force that vibrates the second voice coil 21 may be input to the second coil 212, and in this way, a second electric signal may be an electric signal that generates the second driving force corresponding to a second vibration force that cancels out a first vibration force. Accordingly, the degree of cancellation can be finely adjusted. In the above embodiment, a winding direction of the first coil 112 and a winding direction of the second coil 212 are the same, but these coils should be wound such that a direction of the force generated in the first coil 112 by a magnetic flux crossing the first coil 112 and a current flowing through the first coil 112 is opposite to a direction of the force generated in the second coil 212 by a magnetic flux crossing the second coil 212 and a current flowing through the second coil 212, that is, should be wound so that the first vibration force can be prevented by the second vibration force. Further, in a case where the second coil 212 is connected to another signal circuit different from the signal circuit to which the first coil 112 is connected, the other signal circuit may output an electric signal in which a third electric signal that generates a third driving force corresponding to a third vibration force that suppresses vibration generated outside the speaker devices 1 and 2 is superimposed on the second electric signal. Accordingly, the vibration generated outside the speaker devices 1 and 2 can also be cancelled out.

Note that in the first embodiment, the intermediate magnetic member is composed of one component (first yoke 33), and in the second embodiment, the intermediate magnetic member is composed of two components (first yoke 133F and second yoke 133R), but may be composed of a plurality of components including other magnetic member components. Similarly, the first magnetic member and the second magnetic member may also be constituted by a plurality of magnetic member components.

In the first embodiment and second embodiment, each of the first voice coil 11 and the second voice coil 21 has a cylindrical shape and a circular cross section, for example, a polygonal shape or an elliptical shape in the cross section.

REFERENCE SIGNS LIST

1, 2: speaker device
3, 103: frame
10: first drive unit
11: first voice coil
12: diaphragm
14: first damper portion
20: second drive unit
21: second voice coil
22: second damper portion
30, 130: magnetic circuit
31, 131: top plate
32, 132: first magnet
33, 133F: first yoke
33*d*, 133Fd: protruding portion

34, 134: second magnet
35, 133R: second yoke
135: second top plate
142: recessed portion
G1*a*, G11*a* first magnetic gap
G2*a*, G12*a*: second magnetic gap

The invention claimed is:

1. A speaker device comprising:
a first voice coil;
a second voice coil disposed radially outside the first voice coil;
a first damper supporting the first voice coil to a frame; and
a second damper supporting the second voice coil to the frame, wherein
the first damper comprises a recessed portion, which is separated from the second voice coil more than other portion of the first damper, on an extension line of a vibration direction of the second voice coil.

2. The speaker device according to claim 1, wherein
the second voice coil is capable of vibrating in a direction opposite to the first voice coil.

3. The speaker device according to claim 1, wherein
when the first damper and the second voice coil are closest to each other, a part of the second voice coil is located in the recessed portion.

4. The speaker device according to claim 1, wherein
the second damper includes a plurality of support members arranged side by side in the vibration direction.

5. The speaker device according to claim 1, further comprising:
a magnetic circuit comprising a first magnet and a second magnet, wherein
the first magnet and the second magnet are arranged side by side in the vibration direction.

6. The speaker device according to claim 1, wherein
the recessed portion has higher rigidity than the other portion of the first damper.

7. The speaker device according to claim 1, comprising:
a first drive unit comprising the first voice coil, a diaphragm connected to the first voice coil, and the first damper; and
a second drive unit comprising the second voice coil and the second damper, wherein
a second vibration force generated in the speaker device in response to vibration of the second drive unit is in an opposite direction to a first vibration force generated in the speaker device in response to vibration of the first drive unit at a same period.

8. The speaker device according to claim 7, comprising:
a housing which accommodates the first drive unit and the second drive unit therein, wherein
a lowest resonance frequency of the second drive unit is same as a lowest resonance frequency of the first drive unit.

9. The speaker device according to claim 1, wherein
a second electric signal for vibrating the second voice coil is different from a first electric signal for vibrating the first voice coil.

10. A speaker device comprising:
a first voice coil;
a second voice coil disposed radially outside the first voice coil;
a first damper supporting the first voice coil to a frame;
a second damper supporting the second voice coil to the frame; and
a magnetic circuit comprising a first magnet and a second magnet, wherein
the first magnet and the second magnet are arranged side by side in a vibration direction of the first voice coil,
the magnetic circuit comprises an intermediate magnetic member connected to the first magnet and connected, at a surface different from a surface to which the first magnet is connected, to the second magnet, and
the intermediate magnetic member forms a first magnetic gap in which the first voice coil is disposed and a second magnetic gap in which the second voice coil is disposed.

11. The speaker device according to claim 10, wherein
the magnetic circuit comprises a first magnetic member connected to the first magnet at a surface different from a surface to which the intermediate magnetic member is connected, and
the first magnetic gap is formed between the intermediate magnetic member and the first magnetic member.

12. The speaker device according to claim 11, wherein
the magnetic circuit comprises a second magnetic member connected to the second magnet at a surface different from a surface to which the intermediate magnetic member is connected, and
the second magnetic gap is formed between the intermediate magnetic member and the second magnetic member.

13. The speaker device according to claim 10, wherein
the first magnet and the second magnet are disposed radially inside the second voice coil.

14. The speaker device according to claim 10, wherein
the intermediate magnetic member protrudes radially outside and has a protruding portion that forms the second magnetic gap.

15. A speaker device comprising:
a first voice coil;
a second voice coil disposed radially outside the first voice coil;
a first damper supporting the first voice coil to a frame;
a second damper supporting the second voice coil to the frame; and
a magnetic circuit comprising a first magnet and a second magnet, wherein
the first magnet and the second magnet are arranged side by side in a vibration direction of the first voice coil,
the magnetic circuit comprises an intermediate magnetic member connected to the first magnet and connected, at a surface different from a surface to which the first magnet is connected, to the second magnet,
the first magnet is disposed radially inside the first voice coil,
the second magnet is disposed radially outside the second voice coil,
the intermediate magnetic member comprises a central portion connected to the first magnet and an outer peripheral portion connected to the second magnet,
the first magnet is connected to the central portion of the intermediate magnetic member, and
the second magnet is connected to the outer peripheral portion of the intermediate magnetic member.

* * * * *